(12) United States Patent
Jamin et al.

(10) Patent No.: US 10,969,457 B2
(45) Date of Patent: Apr. 6, 2021

(54) RECEIVER-SYSTEM

(71) Applicant: NXP B.V., Eindhoven (NL)

(72) Inventors: Olivier Jamin, Sainte Honorine du Fay (FR); Anton Salfelner, Pernegg (AT)

(73) Assignee: NXP B.V., Eindhoven (NL)

( * ) Notice: Subject to any disclaimer, the term of this patent is extended or adjusted under 35 U.S.C. 154(b) by 256 days.

(21) Appl. No.: 16/207,120

(22) Filed: Dec. 1, 2018

(65) Prior Publication Data
US 2019/0170847 A1 Jun. 6, 2019

(30) Foreign Application Priority Data

Dec. 1, 2017 (EP) .................................. 17306690

(51) Int. Cl.
*G01S 3/04* (2006.01)
*H04B 7/08* (2006.01)
*G01S 3/46* (2006.01)

(52) U.S. Cl.
CPC ............... *G01S 3/043* (2013.01); *G01S 3/46* (2013.01); *H04B 7/08* (2013.01)

(58) Field of Classification Search
CPC . G01S 3/043; G01S 3/46; G01S 3/023; G01S 3/48; G01S 5/06; H04B 7/08
(Continued)

(56) References Cited

U.S. PATENT DOCUMENTS 9,778,340 B2 10/2017 Mutz et al.
10,481,236 B2 * 11/2019 Simileysky ............... G01S 3/48
(Continued)

FOREIGN PATENT DOCUMENTS

WO 2014001651 A1 1/2014
WO 2015176776 A1 11/2015

OTHER PUBLICATIONS

Extended European Search Report for Patent Appln. No. 17306690.3 (dated Jun. 5, 2018).
(Continued)

*Primary Examiner* — Harry K Liu

(57) ABSTRACT

A receiver-system comprising a path-switching-unit, a redirect-switching-unit, a plurality of receive-paths, and a processor. The path-switching-unit has a plurality of path-switch-input-terminals that are each couplable to a receive-antenna. The redirect-switching-unit has a plurality of redirect-switch-output-terminals that are each associated with one of the plurality of path-switch-input-terminals in order to define a plurality of switch-terminal-pairs. The receive-paths are connected between a path-switch-output-terminal and a redirect-switch-input-terminal. The path-switching-unit and the redirect-switching-unit are configured to selectively connect each receive-path between different ones of the plurality of switch-terminal-pairs, based on a switch-control-signal. The processor can receive first-processor-input-signals from a first configuration of the plurality of receive paths selectively connected between the plurality of switch-terminal-pairs; receive further-processor-input-signals from one or more further configurations of the plurality of receive-paths selectively connected between the plurality of switch-terminal-pairs; and determine an angle-of-arrival associated with the input-signals based on the first-processor-input-signals and further-processor-input-signals.

13 Claims, 5 Drawing Sheets

(58) Field of Classification Search
USPC .......................................................... 342/442
See application file for complete search history.

(56) References Cited

U.S. PATENT DOCUMENTS

| | | | |
|---|---|---|---|
| 10,498,521 B2* | 12/2019 | Little | H04L 5/1461 |
| 10,627,473 B2* | 4/2020 | Park | H04B 7/086 |
| 2003/0197645 A1 | 10/2003 | Ninomiya et al. | |
| 2016/0126990 A1* | 5/2016 | Leipold | H04B 7/08 |
| | | | 370/329 |

OTHER PUBLICATIONS

Yu, B.-G. et al. "A Time-Based Angle-of-Arrival Sensor Using CMOS IR-UWB Transceivers", IEEE Sensors Journal, vol. 16, No. 14, pp. 5563-5571 (Jul. 15, 2016).

* cited by examiner

SYNC1 = First part of the frame synchronization / preamble
Guard1 = guard time between the two parts of the preamble: optional
SYNC2 = Second part of the frame synchronization / preamble DFE: IQ unbalance corrector, NBIC, AGC
PROC: symbol correlator, resample, rake, channel estimate → Real signal
⇨ Complex signal DFE: IQ unbalance corrector, NBIC, AGC
PROC: symbol correlator, resample, rake, channel estimate → Real signal
⇨ Complex signal

RECEIVER-SYSTEM

CROSS-REFERENCE TO RELATED APPLICATIONS

This application claims the priority under 35 U.S.C. § 119 of European patent application no. 17306690.3, filed on Dec. 1, 2017, the contents of which are incorporated by reference herein.

The present disclosure relates to receiver-systems, and in particular to receiver-systems that can determine an angle-of-arrival of received signals.

According to a first aspect of the present disclosure there is provided a receiver-system comprising:
- a path-switching-unit with a plurality of path-switch-input-terminals and a plurality of path-switch-output-terminals, wherein each of the plurality of path-switch-input-terminals is couplable to a receive-antenna and is configured to receive input-signals;
- a redirect-switching-unit with a plurality of redirect-switch-input-terminals and a plurality of redirect-switch-output-terminals, wherein each of the plurality of redirect-switch-output-terminals is associated with one of the plurality of path-switch-input-terminals in order to define a plurality of switch-terminal-pairs;
- a plurality of receive-paths that are connected between a path-switch-output-terminal and a redirect-switch-input-terminal, wherein each receive-path comprises one or more processing blocks;
- wherein the path-switching-unit and the redirect-switching-unit are configured to selectively connect each receive-path between different ones of the plurality of switch-terminal-pairs, based on a switch-control-signal;
- wherein the receiver-system further comprises a processor, connected to the redirect-switch-output-terminals, and configured to:
  - receive first-processor-input-signals from a first configuration of the plurality of receive paths selectively connected between the plurality of switch-terminal-pairs;
  - receive further-processor-input-signals from one or more further configurations of the plurality of receive-paths selectively connected between the plurality of switch-terminal-pairs; and
  - determine an angle-of-arrival associated with the input-signals based on the first-processor-input-signals and further-processor-input-signals.

In one or more embodiments the processor may be configured to determine the angle-of-arrival by performing an averaging operation, either directly or indirectly, on the first-processor-input-signals and further-processor-input-signals. The processor can be configured to determine the angle-of-arrival associated with the input-signals by processing the first-processor-input-signals and the further-processor-input-signals to account for differences in group delay errors of the receive-paths.

In one or more embodiments the processor may be configured to determine:
- a first-angle-of-arrival-measurement based on the first-processor-input-signals;
- one or more further-angle-of-arrival-measurements based on the further-processor-input-signals; and
- the angle-of-arrival associated with the input-signals based on an average of the first-angle-of-arrival-measurement and the one or more further-angle-of-arrival-measurements.

In one or more embodiments the processor may be configured to determine:
- for each switch-terminal-pair: an average-processor-input-signal by combining: (i) the first-processor-input-signal for the switch-terminal-pair, with (ii) the further-processor-input-signal for the same switch-terminal-pair received via a different receive-path; and
- the angle-of-arrival based on the average-processor-input-signals for each of the switch-terminal-pairs.

In one or more embodiments the processor may be configured to determine the angle-of-arrival using relative-phase-differences or relative-time-differences between input-signals received via different switch-terminal-pairs. The processor may be configured to receive first-processor-input-signals and further-processor-input-signals corresponding to frames of input-signals received at the plurality of path-switch-input-terminals. The processor may be configured to receive first-processor-input-signals and further-processor-input-signals corresponding to successive frames of input-signals received at the plurality of path-switch-input-terminals. The processor may be configured to receive first-processor-input-signals and further-processor-input-signals corresponding to different segments within a single frame of input-signals received at the plurality of path-switch-input-terminals.

In one or more embodiments the receiver-system may further comprise a controller configured to provide the switch-control-signal to the path-switching-unit and the redirect-switching-unit. The controller may be configured to provide the switch-control-signal in response to input-signals received by one or more of the plurality of path-switch-input-terminals. The controller may be configured to receive one or more input-signals from the path-switching-unit.

In one or more embodiments the processor may be configured to determine the angle-of-arrival associated with the input-signals based on differences between one first-processor-input-signal and one or more further-processor-input-signals received via the same receive-path, for one or more receive-paths.

In one or more embodiments the switch-control-signal may be configured to control the path-switching-unit and the redirect-switching-unit such that the plurality of switch-terminal-pairs remain connected together through the receive-paths irrespective of which of the receive-paths is used to process any particular input-signal.

In one or more embodiments the controller may be configured to change the state of the switch-control-signal between frames of the input-signals. The controller may be configured to change the state of the switch-control-signal between successive frames (or non-consecutive frames) of the input-signals.

In one or more embodiments the controller may be configured to change the state of the switch-control-signal within a single frame of the input-signals.

In one or more embodiments each of the plurality of receive-paths may comprise one or more of the following processing blocks:
- a low-noise-amplifier;
- an analog to digital converter; and
- a signal processing block.

In one or more embodiments the receiver-system may be configured to be connected to at least three receive-antennas wherein at least one of the at least three receive-antennas is not collinear with the other receive-antennas. The processor may be configured to determine an azimuthal angle-of-arrival associated with the input-signals and an elevation-angle-of-arrival associated with the input-signals.

In one or more embodiments a ranging-system may comprise any receiver-system disclosed herein.

In one or more embodiments a mobile device may comprise the receiver-system disclosed herein.

In one or more embodiments an automotive device may comprise the receiver-system disclosed herein.

According to a further aspect of the present disclosure there is provided a method of determining an angle-of-arrival of input-signals received at a receiver-system, wherein the receiver-system comprises:

a plurality of receive-paths that each comprise one or more processing blocks, wherein each of the plurality of receive-paths is selectively connectable between different ones of a plurality of switch-terminal-pairs;

the method comprising:

receiving first-processor-input-signals from a first configuration of the plurality of receive paths between the plurality of switch-terminal-pairs;

receiving further-processor-input-signals from one or more further configurations of the plurality of receive-paths between the plurality of switch-terminal-pairs; and determining an angle-of-arrival associated with the input-signals based on the received first-processor-input-signals and further-processor-input-signals.

In one or more embodiments the method may further comprise providing a switch-control-signal to set the configuration of the plurality of receive paths.

In one or more embodiments the method may further comprise providing the switch-control-signal to change the configuration of the plurality of receive paths from the first configuration to a further configuration after receiving the first-processor-input-signals.

There may be provided a receiver-system comprising:

a first-receive-path comprising one or more processing blocks;

a path-switching-unit with a plurality of path-switch-input-terminals, wherein each of the plurality of path-switch-input-terminals is couplable to a receive-antenna and configured to receive input-signals;

wherein the path-switching-unit is configured to selectively connect the first-receive-path to a different one of the plurality of path-switch-input-terminals, based on a switch-control-signal;

wherein the receiver-system further comprises a processor, coupled to the first-receive-path, and configured to:

receive a first-processor-input-signal from the first-receive path when it is selectively connected to one of the plurality of path-switch-input-terminals;

receive one or more further-processor-input-signals from the first-receive-path when it is selectively connected to respective different ones of the plurality of path-switch-input-terminals; and determine an angle-of-arrival associated with the input-signals based on the first-processor-input-signal and further-processor-input-signals.

The path-switching-unit may further comprise a plurality of path-switch-output-terminals. The receiver-system further comprise:

a redirect-switching-unit with a plurality of redirect-switch-input-terminals and a plurality of redirect-switch-output-terminals, wherein each of the plurality of redirect-switch-output-terminals is associated with one of the plurality of path-switch-input-terminals in order to define a plurality of switch-terminal-pairs;

a plurality of receive-paths, including the first-receive-path, that are connected between a path-switch-output-terminal and a redirect-switch-input-terminal;

wherein the path-switching-unit and the redirect-switching-unit are configured to selectively connect each receive-path between different ones of the plurality of switch-terminal-pairs, based on the switch-control-signal; and wherein the processor is connected to the redirect-switch-output-terminals, and configured to:

receive first-processor-input-signals from a first configuration of the plurality of receive paths selectively connected between the plurality of switch-terminal-pairs;

receive the further-input-signals from one or more further configurations of the plurality of receive-paths selectively connected between the plurality of switch-terminal-pairs; and determine the angle-of-arrival associated with the input-signals based on the first-processor-input-signals and further-processor-input-signals.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which.

Figure 1A:
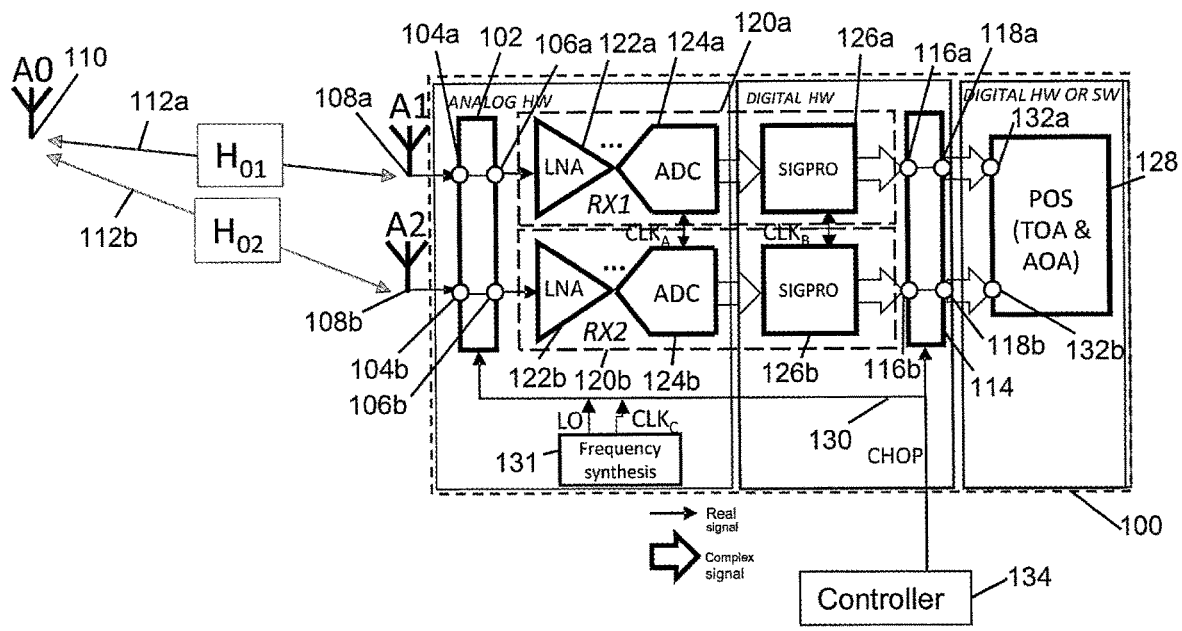
FIGS. 1A and 1B show an example two-channel receiver system.

Ultra-wide-band (UWB) impulse radio has the potential to provide the best relative-ranging accuracy for Time of Flight (TOF) measurements. The distance between two devices ($D_d$) can be measured using a TOF technique, based on the fact that the distance between a transmitter-system and a receiver-system can be calculated from the travel time of a signal that is transmitted between the two systems (time of flight $t_{TOF}$), using the relationship:

$$D_d = c \cdot t_{TOF}$$

where c is the speed of light ($\sim 3 \times 10^8$ m/s).

In order to extend the localization to two or more dimensions, an Angle-Of-Arrival (AoA) measurement can be performed in addition to the TOF measurement.

An angle-of-arrival measurement can determine the propagation direction of reception-signals arriving at the receiver-system from the transmitter-system. In this way, the angle between two devices can be measured. An angle-of-arrival measurement can be determined using a Phase Difference of Arrival (PDoA) or a Time Difference of Arrival (TDoA) technique. These techniques can be performed with: (i) a transmitter-system, which has a transmitting-antenna; and (ii) a receiver-system that is coupled to two receive-antennas. The two receive-antennas are separated from each other by a distance r, and each receive signals transmitted from the transmitter-system as reception-signals. The two receive-antennas provide an input-signal to the receiver-system in response to receiving the reception-signals from the transmitter-system. A PDoA or TDoA between reception-signals received at the two receive-antennas may then be determined by measuring a relative time or phase difference associated with the transmission-paths from the transmitter-system to each receive-antenna. In this way, the angle-of-arrival of the reception-signals can be determined from the input-signals, and therefore the angle-of-arrival of the reception-signals can be considered to be associated with the input-signals.

A time difference of arrival (TDoA) of the reception-signals can be measured as the time difference between a first-reception-signal received at the first receive-antenna and a second-reception-signal received at the second receive-antenna. The time difference can be measured using the input-signals provided by the receive-antennas. This time difference is dependent on the angle between the transmitting-antenna and the line-crossing of the two receive-antennas. The angle-of-arrival of the transmitted signal/reception-signals can be calculated using the following equation:

$$AoA = \frac{180}{\pi} \cdot \text{acos}\left(\frac{TDoA \cdot c}{r}\right)$$

The phase difference of arrival (PDoA) of the signal is measured as the difference of carrier phase of the two reception signals received at the two receive-antennas. This carrier phase difference may be calculated from the in-phase components I and quadrature components Q of the two input-signals. The carrier phase of each signal can be calculated via $\emptyset = \alpha \tan(Q, I)$. The I and Q components may be obtained from each input-signal in a number of ways including (i) down-converting the RF input-signals with two local-oscillator signals in quadrature; (ii) sampling the RF input-signals with analog to digital converters clocked with two clock signals in quadrature; and (iii) using a form of polyphase filter on the RF input-signals. The angle-of-arrival of the transmitted signal/reception-signals can be calculated using the following equation:

$$AoA = \frac{180}{\pi} \cdot \text{acos}\left(\frac{(\emptyset_1 - \emptyset_2) \cdot c}{r \cdot fc \cdot 360}\right)$$

In the above equation f is the frequency of the carrier signals. The PDoA and TDoA techniques can be extended to a greater number of receive-antennas for increased accuracy.

The input-signals provided to the receiver-system by each of the receive-antennas may be processed by respective receive-paths that each include a cascade of processing blocks. The receive-paths of receiver-systems for ultra wideband impulse radios can include one or more of: a low noise amplifier (LNA); a mixer; a baseband analog filter; and an analog-to-digital converter (ADC), for example. The electrical characteristics of these blocks will differ between receive-paths, thereby resulting in different group delays for each receive-path. However, any delay mismatch between receive-paths can result in a corrupted TDoA or PDoA measurement. For instance, a 1 ps time error between two receive-paths can result in a 1° error in a PDoA measurement. It can therefore be desirable to reduce the delay mismatch between receive-paths to less than 1 ps for some applications. Integrating multiple receivers/receive-paths on the same die and/or using the best design and layout techniques cannot fully mitigate the problem of delay mismatch between receive-paths. Residual group delay mismatch between receive-paths can remain across an operating temperature range and can also vary over the lifetime of the receiver-system.

One or more of the examples disclosed herein relate to an apparatus and a method for reducing an undesired impact of time/phase mismatches between different receive-paths.

Figure 1B:
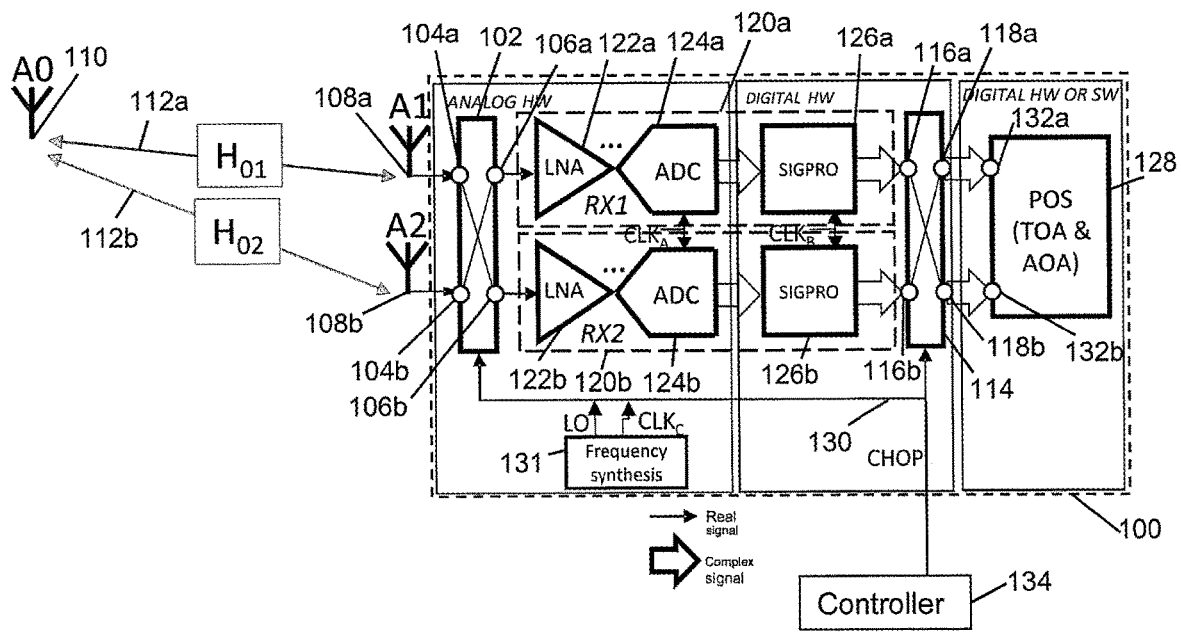

FIGS. 1A and 1B illustrate an example receiver-system 100 according to an embodiment of the present disclosure. The receiver-system 100 receives input-signals from a plurality of receive-antennas 108*a* 108*b*. The receiver-system 100 includes a processor 128 that can calculate an angle-of-arrival of reception-signals received by the receive-antennas 108*a* 108*b* based on the input-signals. The processor 128 can also be referred to as a ranging algorithm unit. The input-signals propagate through the receive-paths 120*a* 120*b* and switching units 102 114 and are received at the processor 128 as processer-input-signals. As will be discussed in detail below, advantageously the receiver-system 100 can selectively direct the input-signals through a plurality of different receive-paths RX1, RX2 120*a*, 120*b* such that the processor 128 can calculate the angle-of-arrival based on the processor-input-signals that have taken different paths through the receiver-system 100 from a receive-antenna 108*a*, 108*b* to the processor 128. In this way, the processor 128 can account for any delay mismatch between the receive-paths RX1, RX2 120*a* 120*b* based on the processor-input-signals received via different configurations of the receive-paths RX1, RX2 120*a* 120*b*. The receiver-system 100 may be configured to determine time-of-flight measurements for the reception-signals in addition to the angle-of-arrival determination.

The receiver-system 100 includes a path-switching-unit 102 and a redirect-switching-unit 114, which can be provided as multiplexers. The path-switching-unit 102 and the redirect-switching-unit may comprise RF switches (Single-Pole-Double-Throw for instance). The redirect-switching-unit 114 may be implemented as hardware. Alternatively, the functionality of the redirect-switching-unit may be implemented by software.

The path-switching-unit 102 and the redirect-switching-unit 114 are controlled by a switch-control-signal CHOP 130, such that the switching-units 102, 114 can define different configurations of the receive-paths RX1, RX2 120*a*. The switch-control-signal CHOP 130 is provided by a controller 134 in this example. In other examples, the switch-control-signal CHOP 130 may be provided by a modem. Examples of how the switch-control-signal CHOP 130 can be provided are described below with reference to FIGS. 2 and 3.

The path-switching-unit 102 comprises a plurality of path-switch-input-terminals 104a 104b that are each couplable to a respective receive-antenna 108a 108b. In this example, each of the path-switch-input-terminals 104a 104b is coupled to a respective receive-antenna 108a 108b. Each receive-antenna 108a 108b is configured to receive reception-signals from an external transmitting antenna 110 via a respective transmission-path 112a 112b. In this example, the transmission-paths 112a 112b shown are direct line-of-sight (LOS) paths. The receive-antennas 108a 108b may receive reception-signals from non-LOS paths and the receiver-system 100 may process the resulting input-signals using multi-path propagation methods. The external transmitting antenna 110 may be part of a separate transmitting device. A response of a first-receive-antenna A1 108a to the transmitting antenna A0 110 is denoted $H_{O1}$, which can be indicative of the transfer function of the signal path between the transmitting antenna A0 110 and the first-receive-antenna A1 108a. Similarly, a response of a second-receive-antenna A2 108b to the transmitting antenna A0 110 is denoted $H_{O2}$, which can be indicative of the transfer function of the signal path between the transmitting antenna A0 110 and the second-receive-antenna A2 108b. In other examples, the receive-antennas 108a 108b may receive reception-signals from a plurality of transmitting antennas.

The path-switching-unit 102 further comprises a plurality of path-switch-output-terminals 106a 106b, which are each connected to an input terminal of one of the receive-paths RX1 RX2 120a 120b. The path-switching-unit 102 can connect any of the plurality of path-switch-input-terminals 104a 104b to any of the plurality of path-switch-output-terminals 106a 106b based on the switch-control-signal CHOP 130.

The redirect-switching-unit 114 comprises a plurality of redirect-switch-input-terminals 116a 116b and a plurality of redirect-switch-output-terminals 118a 118b. Each of the redirect-switch-input-terminals 116a, 116b is connected to an output terminal of one of the receive-paths RX1, RX2 120a 120b. Each of the redirect-switch-output-terminals 118a, 118b is connected to the processor 128. The redirect-switching-unit 114 can connect any of the plurality of redirect-switch-input-terminals 116a 116b to any of the plurality of redirect-switch-output-terminals 118a 118b, again based on the switch-control-signal CHOP 130.

Each of the plurality of redirect-switch-output-terminals 118a 118b is associated with one of the plurality of path-switch-input-terminals 104a 104b to define a plurality of switch-terminal-pairs. For example, the first-path-switch-input-terminal 104a and the first-redirect-switch-output-terminal 118a define a first-switch-terminal-pair, the second-path-switch-input-terminal 104b and the second-redirect-switch-output-terminal 118b define a second-switch-terminal-pair, and so on. The switch-control-signal CHOP 130 can control both the path-switching-unit 102 and the redirect-switching-unit 114 such that the plurality of switch-terminal-pairs remain connected together through the receive-paths RX1, RX2 120a, 120b, irrespective of which of the receive-paths RX1, RX2 120a, 120b is used to process any particular input-signal.

As indicated above, the plurality of receive-paths 120a 120b are each connected between one of the path-switch-output-terminals 106a 106b and one of the redirect-switch-input-terminals 116a 116b. Each receive-path 120a 120b contains one or more processing blocks. In this example, each receive-path 120a 120b comprises a low-noise-amplifier 122a 122b, an analog-to-digital converter (ADC) 124a 124b and a signal-processing-block (SIGPRO) 126a 126b. In some examples, each receive-path 120a 120b may use equal gain settings to help reduce delay mismatch errors between the receive-paths 120a 120b.

The receiver-system 100 can optionally include a frequency-synthesizer 131. The frequency-synthesizer 131 can generate clock signals CLK that may be required by the receiver-system 100. In this example, the frequency-synthesizer provides: (i) a first (analog) clock signal $CLK_A$ to the ADC 124a 124b of each receive-path 120a 120b; (ii) a second (digital) clock signal $CLK_B$ to the signal-processing-block 126a 126b of each receive-path 120a 120b; and a third clock signal $CLK_C$ to assist with the generation of the switch-control-signal CHOP 130. In this example, the receive-paths 120a 120b share the same clock-signals $CLK_A$ $CLK_B$ which can help reduce mismatch errors between the receive-paths. Alternatively, the receive-paths 120a 120b may be provided with separate dock signals. Some or all of the clock signals provided by the frequency-synthesizer 131 may have identical frequency, phase and/or duty cycle. The frequency synthesiser 131 can also provide a local oscillator signal LO. The local oscillator signal may be used in the generation of the switch-control-signal 130. Each receive-path 120a 120b may further comprise a mixer (not shown) and the frequency-synthesiser 131 can provide the local oscillator signal LO to the mixers. The local oscillator signal LO may then be used to determine the I and Q components of an input-signal for a PDoA measurement.

The path-switching-unit 102 and the redirect-switching-unit 114 are configured to selectively connect each receive-path 120a 120b between different ones of the plurality of switch-terminal-pairs based on a switch-control-signal CHOP 130. To achieve this: the path-switching-unit 102 configures connections between the path-switch-input-terminals 104a 104b and the path-switch-output-terminals 106a 106b; and the redirect-switching-unit 114 configures corresponding connections between the redirect-switch-input-terminals 116a 116b and the redirect-switch-output-terminals 118a 118b.

The example of FIG. 1A illustrates a two-channel receiver-system 100 with a first configuration of receive-paths 120a 120b wherein the path-switching-unit 102 is configured to: (i) connect a first-path-switch-input-terminal 104a to a first-path-switch-output-terminal 106a; and (ii) connect a second-path-switch-input-terminal 104b to a second-path-switch-output-terminal 106b. The redirect-switching-unit 114 is configured to: (i) connect a first-redirect-switch-input-terminal 116a to a first-redirect-switch-output-terminal 118a; and (ii) connect a second-redirect-switch-input-terminal 116b to a second-redirect-switch-output-terminal 118b. In this way: a first-receive-path 120a is selectively connected between the first-switch-terminal-pair, and a second-receive-path 120b is selectively connected between the second-switch-terminal-pair.

FIG. 1B illustrates a second configuration of receive-paths 120a 120b for the two-channel receiver-system 100. In the second configuration, the path-switching-unit 102 is configured to: (i) connect the first-path-switch-input-terminal 104a to the second-path-switch-output-terminal 106b; and (ii) connect the second-path-switch-input-terminal 104b to the first-path-switch-output-terminal 106a. The redirect-switching-unit 114 is configured to: (i) connect the first-redirect-switch-input-terminal 116a to the second-redirect-switch-output-terminal 118b; and (ii) connect the second-redirect-switch-input-terminal 116b to the first-redirectswitch-output-terminal 118a. In this way: the first-receive-path 120a is selectively connected between the second-switch-terminal-pair and the second-receive-path 120b is selectively connected between the first-switch-terminal-pair.

The processor 128 comprises a plurality of processor-input-terminals 132a 132b, each connected to a respective one of the redirect-switch-output-terminals 118a 118b. In this way, the processor 128 is connected to each of the plurality of switch-terminal-pairs. As a result, each receive-antenna 108a, 108b is associated (via one of the plurality of switch-terminal-pairs) with a corresponding processor-input-terminal 132a, 132b. This association between a receive-antenna 108a 108b and a processor-input-terminal 132a 132b can be important for the processor 128 to be able to calculate the angle-of-arrival of the reception-signals.

The receive-paths 120a 120b are selectively connected between different pairs of the switch-terminal-pairs, in response to the switch-control-signal CHOP 130. As a result, the switching-units 102 114 can selectively connect each receive-path 120a 120b between different receive-antennas 108a 108b and their associated processor-input-terminal 132a 132b. As will be discussed below, in this way different receive-paths 120a 120b can be used to process input-signals received from each receive-antenna 108a 108b and therefore the undesired effects of any mismatches between the receive-paths 120a 120b can be reduced. This can improve the accuracy with which the angle-of-arrival can be calculated.

The processor 128 is configured to receive the processor-input-signals from the plurality of receive-paths 120a 120b selectively connected between the plurality of switch-terminal-pairs. For example, the processor 128 can receive first-processor-input-signals from a first configuration of the plurality of receive-paths 120a 120b selectively connected between the plurality of switch-terminal-pairs. That is, the plurality of receive-paths 120a 120b are in a first configuration between each of the plurality of receive-antennas 108a 108b and its associated processor-input-terminal 132a 132b. Subsequently, the processor 128 can receive further-processor-input-signals from one or more further, different, configurations of the plurality of receive-paths 120a 120b selectively connected between the plurality of switch-terminal-pairs. The first and further configurations of the plurality of receive-paths 120a 120b are set by the switch-control-signal CHOP 130.

In the example receiver-system of FIGS. 1A and 1B, the processor 128 can receive first-processor-input-signals from the first configuration of receive-paths RX1 RX2 120a 120b described above (and illustrated in FIG. 1A) in which: the first-receive-path RX1 120a is selectively connected between the first-switch-terminal-pair and the second-receive-path RX2 120b is selectively connected between the second-switch-terminal-pair. That is, the first-receive-antenna A1 108a is connected to its associated first-processor-input-terminal 132a via the first-receive-path RX1 120a and the first switch-terminal-pair. Similarly, the second-receive-antenna A2 108b is connected to its associated second-processor-input-terminal 132b via the second-receive-path RX2 120b and the second switch-terminal-pair.

In the first configuration of receive-paths RX1 RX2 120a 120b, the processor 128 receives first-processor-input-signals from the first and second receive-antennas 108a 108b via the first and second receive-paths RX1 RX2 120a 120b respectively. The processor 128 can store or process these signals, as discussed below.

The controller 134 can then change the state of the switch-control-signal 130 such that the path-switching-unit 102 and the redirect-switching unit 114 provide the second configuration of the receive-paths RX1 RX2 120a 120b between the switch-terminal-pairs.

The processor 128 can then receive second-processor-input-signals from the second configuration of receive-paths 120a 120b described above (and illustrated in FIG. 1B) in which: the first-receive-path RX1 120a is selectively connected between the second-switch-terminal-pair and the second-receive-path RX2 120b is selectively connected between the first-switch-terminal-pair. That is, the first-receive-antenna A1 108a is connected to its associated first-processor-input-terminal 132a via the second-receive-path RX2 120b. Similarly, the second-receive-antenna A2 108b is connected to its associated second-processor-input-terminal 132b via the first-receive-path RX1 120a.

In the second configuration of receive-paths, the processor 128 receives second-processor-input-signals from the first and second receive-antennas 108a 108b via the second and first receive-paths RX2 RX1 120b 120a respectively.

The processor 128 can determine an AoA of the reception-signals based on the received first-processor-input-signals and further-processor-input-signals, which can involve processing the first-processor-input-signals and further-processor-input-signals to correct for group delay mismatch between the different receive-paths 120a 120b. For example, the processor 128 can determine a first-angle-of-arrival-measurement for the first-processor-input-signals and one or more further-angle-of-arrival-measurements for the further-processor-input-signals. The processor 128 can then calculate the AoA of the reception-signals based on an average value of the first-angle-of-arrival-measurement and the further-angle-of-arrival-measurements. The processor may determine the first-angle-of-arrival measurement and/or the further-angle-of-arrival measurement using a PDoA or TDoA technique.

As a further alternative, the processor 128 may determine the AoA of the reception-signals from signal differences between first-processor-input-signals and one or more further-processor-input-signals received via the same receive-paths. For example, the first-configuration may comprise: the first-receive-path 120a selectively connected to the first-switch-terminal-pair the second-receive-path 120b selectively connected to the second-switch-terminal-pair and so on. A second-configuration may comprise the first-receive-path 120a selectively connected to the second-switch-terminal-pair the second-receive-path 120b selectively connected to the third-switch-terminal-pair, and so on, with a final-receive-path selectively connected to the first-switch-terminal-pair. In this way, signal differences between the first-processor-input-signals and second-processor-input-signals received via the same receive-path can: (i) cancel any group delay of the receive-path; and (ii) provide the signal difference between the reception-signals received by two adjacent receive-antennas. This signal difference can then be converted to an angle-of-arrival of the reception-signals.

In the example illustrated by FIGS. 1A and 1B, the processor 128 may determine the corrected angle-of-arrival from a signal-difference between (i) the first-processor-input-signal received from the first-receive-antenna A1 108a via the first-receive-path RX1 120a; and (ii) the second-processor-input-signal received from the second-receive-antenna A2 108b via the first-receive-path RX1 120a. The signal-difference may be a time difference or a phase difference and should be independent of a first-group-delay of the first-receive-path RX1 120a. Similarly, the processor 128 may determine the corrected angle-of-arrival from a signal-difference between the first-processor-input-signal and the second-processor-input-signal received via the second-receive path RX2 120b. The processor 128 may combine both approaches, for example by averaging, to obtain a more robust measurement.

This signal difference approach can be simplified to an example receiver-system comprising only one receive-path. Such a receiver-system may not require a redirect-switching-unit. The processor can determine the AoA of the reception-signals from a first-processor-input-signal and one or more further-processor-input-signals received from the receive path for first and further configurations of the path-switching-unit. The first and further configurations of the path-switching unit correspond to selectively connecting the receive-path to different receive-antennas.

Receiver-systems comprising a plurality of receive-paths can benefit from receiving simultaneous input-signals from each the plurality of receive-antennas for each configuration. In this way, errors arising from changes in: (i) the receiver-system (for example, a change in phase noise); (ii) the communication channel; or (iii) the relative movement of the receiver-system relative to the transmitter-system, can be reduced.

The processor 128 may use averaging, simultaneous equations, or other logic to determine the AoA of the reception-signals.

The example of FIGS. 1A and 1B illustrates a two-channel receiver-system. That is, the plurality of: (i) path-switch-input-terminals 104a 104b; (ii) path-switch-output-terminals 106a 106b; (iii) redirect-switch-input-terminals 116a 116b; (iv) redirect-switch-output-terminals 118a 118b; (v) switch-terminal-pairs; (vi) processor-input-terminals 132a 132 b; and (vii) receive-paths 120a 120b corresponds to two of each plurality (a first- and a 15 second-). The plurality may correspond to three or four or any higher integer and may be defined by the number of receive-antennas 108a 108b to be connected to the receiver-system 100.

In one example embodiment of the present disclosure, the plurality corresponds to at least three of each of the above listed pluralities. A receiver-system with at least three path-switch-input-terminals may be connected to at least three receive-antennas that are not arranged collinearly. In this way, the receiver-system may determine two angles-of-arrival that are in different dimensions, such as an azimuthal-angle-of-arrival and an elevation-angle-of-arrival. The two angles-of-arrival may be calculated using the same approach as described herein for a single angle-of-arrival. This two angle-of-arrival determination can enable the receiver-system to determine a 3-dimensional position of the receiver-system relative to the transmission-antenna.

Figure 2:
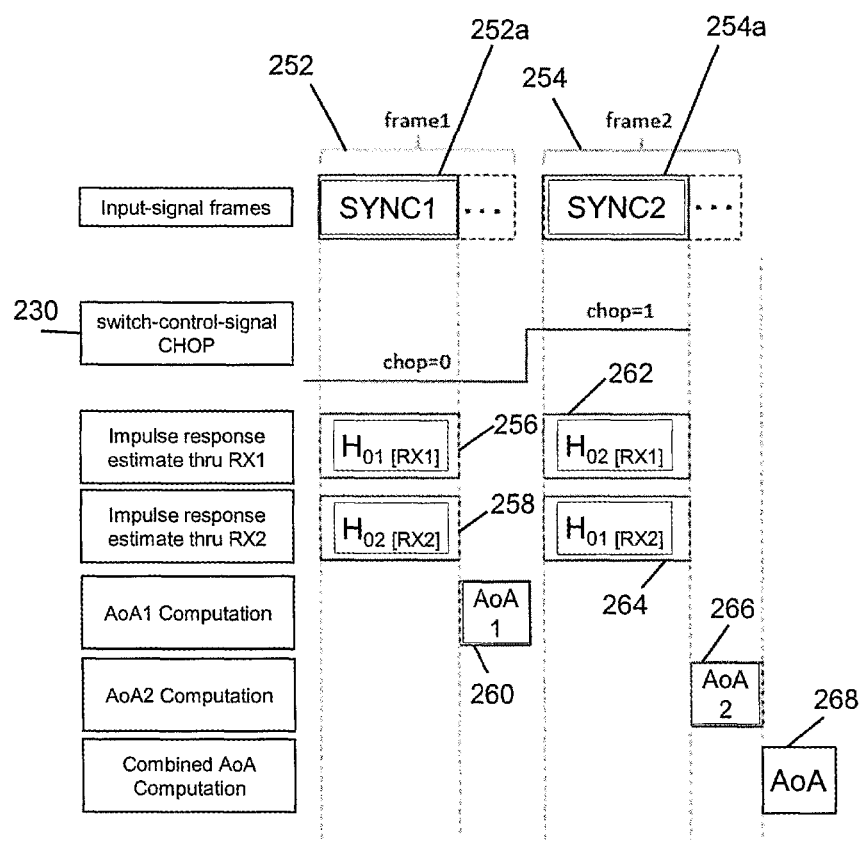
FIG. 2 shows schematically an example angle-of-arrival determination that can be performed using the two channel receiver system of FIG. 1.

FIG. 2 illustrates schematically an angle-of-arrival determination by a two-channel receiver-system such as the one illustrated in FIGS. 1A and 1B. In this example, the controller (not shown) is configured to change the state of the switch-control-signal 230 between successive frames 252 254 of the transmitted signal/reception-signals/input-signals. A first-frame 252 and a second-frame 254 each comprise a synchronisation-segment SYNC1, SYNC2 252a 254a. The remainder of the first-frame 252 and the second-frame 254 may contain other preamble data and payload data.

The controller can provide the switch-control-signal 330 to the path-switching-unit and the redirect-switching-unit. The controller may be configured to change the state of the switch-control-signal 330 in response to input-signals received by the receiver system. The controller may receive one or more of the input-signals from one or more receive-antennas connected to the receiver-system. The controller may receive one or more of the input-signals from the path-switching-unit or from another component of the receiver-system. The controller may change the state of the switch-control-signal 230 at times that correspond to the interval between frames 252 254 of the input-signals, as shown in FIG. 2. The end of a frame 252 254 may trigger the controller to change the state of the switch-control-signal 230. The end of a synchronisation-segment 252a 254a may trigger the controller to change the state of the switch-control-signal 230.

The switch-control-signal 230 may control the switching of the path-switching-unit and the redirect-switching-unit at the same time. In this way: (i) the path-switch-input-terminal to patch-switch-output-terminal connections; and (ii) the redirect-switch-input-terminal to redirect-switch-output-terminal connections are reconfigured to a new configuration at each state change of the switch-control-signal 230.

In the example of FIG. 2, the switch-control-signal CHOP 230 is in a low logic level, CHOP=0, during the first-frame 252 and switches to a high logic level, CHOP=1, in the interval between the first-frame 252 and the second-frame 254. During the first-frame 252, the controller provides the switch-control-signal 230 (CHOP=0) to the path-switching-unit and the redirect-switching-unit to provide a first configuration of the first and second receive-paths RX1, RX2, between the first and second switch-terminal-pairs. In this way: the first-receive-path RX1 is connected to the first-receive-antenna; and the second-receive-path RX2 is connected to the second-receive-antenna.

The processor of the receiver-system receives a first-processor-input-signal, denoted $H_{o1[RX1]}$, corresponding to the response of the first-receive-antenna to the transmission of the transmission-antenna received via the first receive-path RX1. In other words, an impulse response estimate through RX1 is made as illustrated at block 256. At the same time, the processor receives another first-processor-input-signal, denoted $H_{o2[RX2]}$, corresponding to the response of the second-receive-antenna to the transmission of the transmission-antenna received via the second-receive-path RX2. In other words, an impulse response estimate through RX2 is made as illustrated at block 258. Subsequently, at block 260, the processor determines a first-angle-of-arrival-measurement, or AoA1 computation, based on the first-processor-input-signals $H_{o1[RX1]}$, $H_{o2[RX2]}$.

During the second-frame 254, the controller provides the switch-control-signal 230 (CHOP=1) to the path-switching-unit and the redirect-switching-unit to provide a second configuration of the first and second receive-paths RX1, RX2, between the first and second switch-terminal-pairs. In this second configuration: the first-receive-path RX1 is connected to the second-receive-antenna; and the second-receive-path RX2 is connected to the first-receive-antenna.

Therefore, during the second-frame 254, the processor of the receiver-system receives a second-processor-input-signal, denoted $H_{o2[RX2]}$, corresponding to the response of the second-receive-antenna to the transmission of the transmission-antenna received via the first receive-path RX1. In other words, an impulse response estimate through RX1 is made as illustrated at block 262. At the same time, the processor receives another second-processor-input-signal, denoted $H_{o1[RX2]}$, corresponding to the response of the first-receive-antenna to the transmission of the transmission-antenna received via the second-receive-path RX2. In other words, an impulse response estimate through RX2 is made as illustrated at block 264. Subsequently, at block 266, the processor determines a second-angle-of-arrival-measurement, or AoA2 computation, based on the second-processor-input-signals $H_{o2[RX1]}$, $H_{o1[RX2]}$.

At block 268, the processor determines a corrected angle-of-arrival associated with the input-signals, with a combined AOA computation. In this example. the processor determines the corrected angle-of-arrival from the first-angle-of-arrival-measurement and the second-angle-of-arrival measurement, for instance, by averaging the first-angle-of-arrival-measurement and the second-angle-of-arrival-measurement.

The above angle-of-arrival determination can be summarised by:

First-Angle-of-Arrival Measurement (A1 connected to RX1, A2 connected to RX2):
  $H_{01}$ is evaluated through RX1 (256)
  $H_{02}$ is evaluated through RX2 (258)
  A first angle-of-arrival is measured (260).
Second-Angle-of-Arrival-Measurement (A2 connected to RX1, A1 connected to RX2):
  $H_{02}$ is evaluated through RX1 (262)
  $H_{01}$ is evaluated though RX2 (264)
  A second angle-of-arrival is measured (266).
The two angle-of-arrival measurements are averaged (268).

Where $H_{xy[RXz]}$ represents the impulse response from transmission-antenna "x" to receive-antenna "y" observed via receive-path RX "z". That is:

$H_{01\ [RX1]}$: impulse response from A0 to A1, observed through receive-path RX1
$H_{02\ [RX2]}$: impulse response from A0 to A2, observed through receive-path RX2
$H_{01\ [RX2]}$: impulse response from A0 to A1, observed through receive-path RX2
$H_{02\ [RX1]}$: impulse response from A0 to A2, observed through receive-path RX1

In FIG. 2, the controller changes the state of the switch-control-signal 230 such that AoA measurements are calculated for adjacent frames 252, 254 of the input-signals. It will be appreciated that in other examples, the controller can change the state of the switch-control-signal 230 such that AoA measurements are calculated for frames of the input-signals that are not successive (non-consecutive). In this way, the processor can determine the angle-of-arrival associated with the input-signals based on first-processor-input-signals and further-processor-input-signals that do not necessarily relate to adjacent frames.

At least 2 approaches are possible for determination of the angle-of-arrival (AoA) from the 4 impulse responses:
Approach 1 (described above)
  a) First AoA measurement=f($H_{o1[RX1]}$, $H_{o2[RX2]}$)
  b) Second AoA measurement=f($_{H o1[RX2]}$, $H_{o2[RX1]}$)
  c) Determine corrected AoA=average of AoA1 and AoA2
Approach 2
  a) Combine impulse responses: $H_{o1}$=g($H_{o1[RX1]}$, $H_{o1[RX2]}$), $H_{o2}$=g($H_{o2[RX1]}$, $H_{o2[RX2]}$),
  b) Determine corrected AoA=f($H_{o1}$, $H_{o2}$)

In this way, for Approach 2, the processor can calculate an average-processor-input-signal for each switch-terminal-pair (and therefore also for each receive-antenna) by combining: (i) the first-processor-input-signal for a given switch-terminal-pair (via a first receive-path); with (ii) the further-processor-input-signal for the same switch-terminal-pair via a different receive-path. The processor can then calculate the AoA based on the average-processor-input-signals for each of the receive-antennas.

It will therefore be appreciated that the processor can determine the corrected angle-of-arrival either directly or indirectly from the first-processor-input-signals $H_{o1[RX1]}$, $H_{o2[RX2]}$ and the second-processor-input-signals $H_{o2[RX1]}$, $H_{o1[RX2]}$.

Figure 3A:
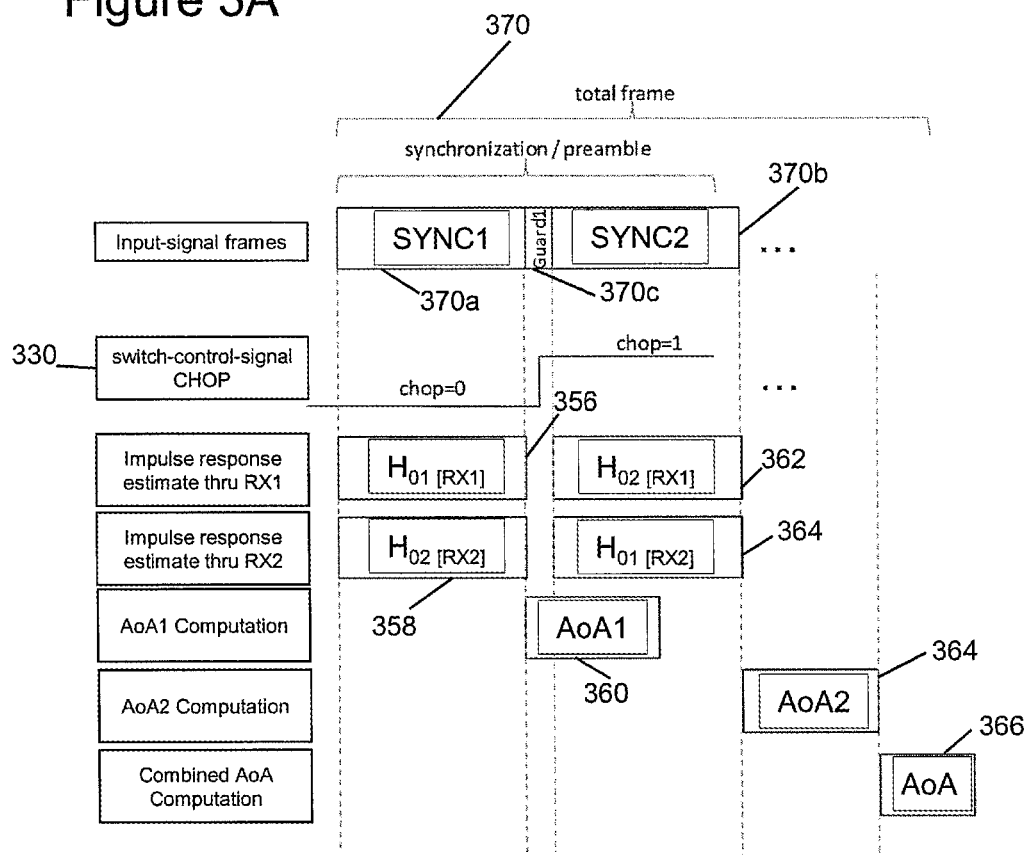
FIG. 3A shows schematically a further example angle-of-arrival determination that can be performed using the two channel receiver system of FIG. 1.

FIG. 3A illustrates schematically a further angle-of-arrival determination by a two-channel receiver-system such as the one illustrated in FIGS. 1A and 1B. In this example, the controller (not shown) is configured to change the state of the switch-control-signal 330 within a single frame 370 of the transmitted signal/reception signals/input-signals. The frame 370 comprises a first-synchronisation-segment SYNC1 370a and a second-synchronisation-segment SYNC2 370b. The first-synchronisation-segment SYNC1 370a may correspond to the first part of the frame synchronisation or preamble. Similarly, the second-synchronisation-segment SYNC2 370b may correspond to the second part of the frame synchronisation or preamble. For example, the second-synchronisation-segment may correspond to a synchronous transport signal. In this example, the first-synchronisation-segment SYNC1 370a and the second-synchronisation-segment SYNC2 370b are separated by a guard-segment or guard-time 370c. The frame synchronization/preamble may be said to be split into two parts, separated by the guard-segment 370c. The frame may contain additional segments, such as a start frame delimiter, between the first-synchronization-segment 370a and the second-synchronization-segment 370b.

Figure 3B:
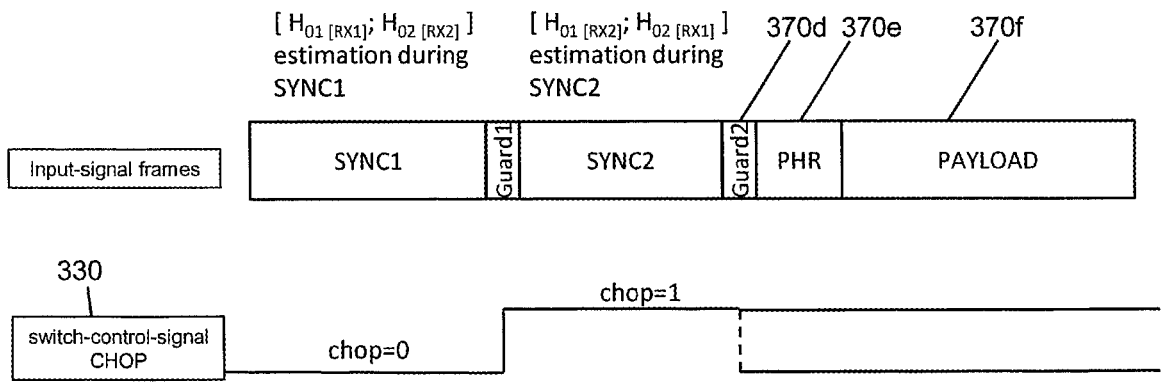
FIG. 3B shows schematically am example frame of data that can be used to determine an angle-of-arrival.

The remainder of the frame 370 may contain a payload header PHR 370e, a second guard-segment 370d (between the last part of the preamble and the payload header PHR 370e), and/or payload data 370f, as illustrated in FIG. 3B. In other examples, the signals may comprise further-synchronisation-segments which may be separated by further guard-segments.

Returning to FIG. 3A, the controller can provide the switch-control-signal 330 to the path-switching-unit and the redirect-switching-unit, to change the configuration of the receive paths RX1 RX2, during the guard-segments 370c. The number of synchronisation-segments may correspond to the number of times the controller is required to change the state of the switch-control-signal 330. That is, the number of synchronisation-segments may correspond to the number of configurations of receive-paths required (or desired) to obtain a corrected angle-of-arrival associated with the input-signals. The number of synchronisation-segments may be less than the number of receive-antennas (or path-switch-input-terminals).

The controller may receive one or more of the input-signals by any of the approaches described in relation to FIG. 2.

In the example of FIG. 3A, the angle-of-arrival determination proceeds in a similar way as described for FIG. 2. Differences include: (i) that the first-frame and the second frame of FIG. 2 are replaced by the first-synchronisation-segment 370a and second-synchronisation-segment 370b of FIG. 3A respectively; and (ii) the switch-control-signal CHOP 330 switches to a high logic level (CHOP=1) during the guard segment 370c rather than between frames.

In the intra-frame example of FIG. 3A, the second-processor-input-signals $H_{o2[RX1]}$, $H_{o1[RX2]}$ are received by the processor after a first-synchronisation-segment-time $T_{SYNC}$ and the guard-time $T_{GUARD}$. This may be approximately 100 us, and independent of any payload duration which may form part of the remainder of the frame. This can be advantageous when the transmission-antenna moves relative to the receive-antennas/receiver-system during the angle-of-arrival determination. For example, if the receiver-system is part of a smart phone an intra-frame angle-of-arrival determination can reduce the impact of movement of the smart phone between the receipt of the first-processor-input-signals and the second-processor-input-signals. This can result in a more accurate angle-of-arrival determination.

Figure 4:
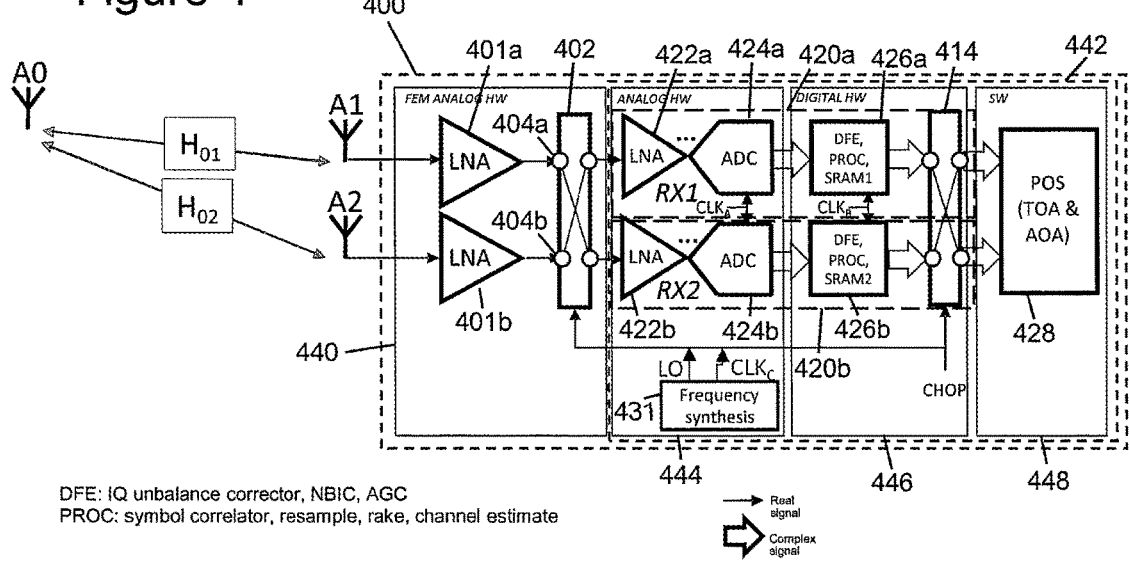
FIG. 4 shows another example two channel receiver system.

FIG. 4 illustrates another example receiver-system 400 according to an embodiment of the present disclosure. Features of FIG. 4 that are also shown in FIG. 1 have been given corresponding reference numbers in the 400 series and will not necessarily be described again here.

In this example, a plurality of receiver-low-noise-amplifiers 401a 401b are connected to the plurality of path-switch-input-terminals 404a 404b. The plurality of receiver-low-noise-amplifiers 401a 401b and the path-switching-unit 402 may be formed on a front-end-module-chip 440. The plurality-of-receive-paths 420a 420b, the redirect-switching-unit 414 and the processor 428 may be formed as an integrated-circuit or a system-on-chip (SOC) 442, which is separate to the front-end-module 440.

The front-end-module-chip 440 may be located within the receiver-system 400, such that the front-end-module-chip 440 is adjacent to the plurality of receive-antennas 408a 408b when they are connected. This may improve sensitivity. The SOC 442 may be located within the receiver-system 400 such that interference from any connected receive-antennas 408a 408b on the components of the SOC 442 is reduced.

In the example of FIG. 4, each of the plurality of receive-paths 420a 420b comprise a low-noise-amplifier 422a 422b, an analog-to-digital-converter 424a 424b and a signal-processing-block 426a 426b. In this example, each of the signal-processing-blocks 426a 426b include a digital-front-end (DFE), signal processing functions (PROC) and a memory (SRAM). The digital-front-end may include an I/Q unbalance corrector, automatic gain control (AGC) and narrow-band interference cancellation (NBIC). The low-noise-amplifier 422a 422b and the analog-to-digital-converter 424a 424b of each of the plurality of receive-paths 420a 420b may be considered as an analog-hardware-block 444. The redirect-switching-unit 414 and the signal-processing-blocks 426a 426b of each of the plurality of receive-paths 420a 420b may be considered as a digital-hardware-block 446. The processor 428 may be implemented using software and considered part of a software-block 448. Alternatively, the processor may be implemented as hardware and form part of the digital-hardware-block 446. Further examples may implement the functionality of the redirect-switching-unit 414 using software as part of the software-block 448.

Locating the path-switching-unit 402 at the output of the plurality of receive-low-noise-amplifiers 401a 401b can reduce the cascaded noise figure of the receiver-system 100. In other examples, the path-switching-unit 402 may be located before the plurality of receive-low-noise-amplifiers 401a 401b. In further examples, the redirect-switching-unit 414 may be located before the plurality of signal-processing-blocks 426a 426b. In such examples, the plurality of receive-paths 420a 420b would not comprise the signal-processing-block 426a 426b.

For intra-frame switching of the receive-path configurations, it can be advantageous for the guard-time $T_{GUARD}$ to be greater than 1 us. It can also be advantageous for both: a switching time of the switch-control-signal 430; and a settling time of an interface between the front-end-module-chip 440 and the analog-hardware-block 444, to be less than 1 us.

Figure 5:
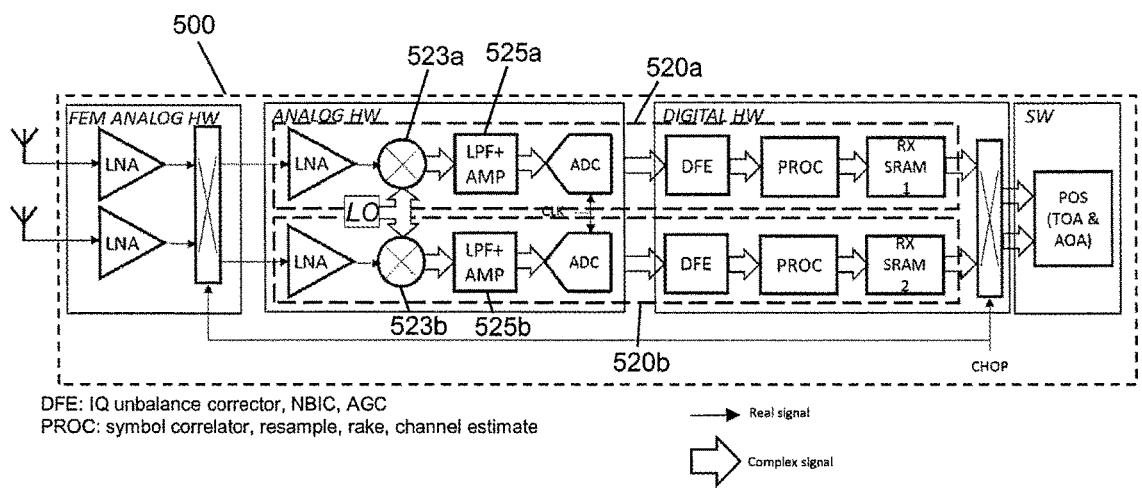
FIG. 5 illustrates another example receiver-system according to an embodiment of the present disclosure.

FIG. 5 illustrates another example receiver-system 500 according to an embodiment of the present disclosure. Features of FIG. 5 that are also shown in FIGS. 1 and 4 have been given corresponding reference numbers in the 500 series and will not necessarily be described again here.

In this example, each receive-path 520a 520b further comprises a mixer 523a 523b and a low-pass-filter (LPF) and amplifier (AMP) block 525a 525b. A local oscillator signal LO is provided to the mixers 523a 523b. The local oscillator signal LO may comprise two signals: an I-signal; and a Q-signal; where the I-signal is shifted in phase by 90° relative to the Q-signal. The local oscillator signal LO may be provided by a frequency synthesizer (not shown). Each mixer 523a 523b can mix the input-signals with the local oscillator signal LO. In this way, the receiver system 500 can determine the in-phase components I and quadrature components Q of the input-signals for use in PDoA measurements.

Figure 6:
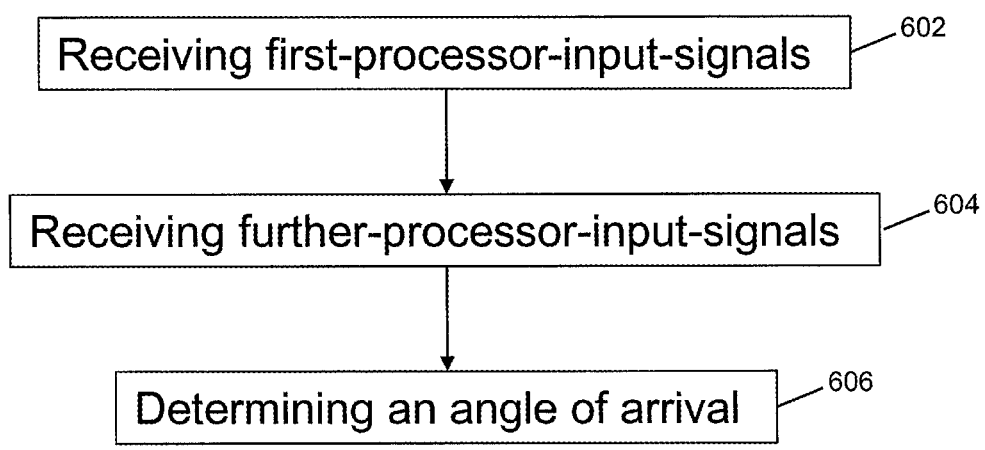
FIG. 6 illustrates schematically a method according to an embodiment of the present disclosure.

FIG. 6 illustrates a method of determining an angle-of-arrival of input-signals received at a receiver-system according to an embodiment of the present disclosure. The method may be performed by a processor, and can be performed by software. In line with the above description, the receiver-system can comprise: a plurality of receive-paths that each comprise one or more processing blocks. Each of the plurality of receive-paths is selectively connectable between different ones of a plurality of switch-terminal-pairs.

The method begins at step 602 with receiving first-processor-input-signals from a first configuration of the plurality of receive paths between the plurality of switch-terminal-pairs. For instance, the first configuration may be the configuration illustrated in FIG. 1A.

At step 604, the method includes receiving further-processor-input-signals from one or more further, different, configurations of the plurality of receive-paths between the plurality of switch-terminal-pairs. By way of example, a further configuration may be the configuration illustrated in FIG. 1B.

At step 606, the method includes determining an angle-of-arrival associated with the input-signals based on the received first-processor-input-signals and further-processor-input-signals. As discussed above, this may involve determining: (i) a first-angle-of-arrival-measurement based on the first-processor-input-signals; (ii) one or more further-angle-of-arrival-measurements based on the further-processor-input-signals; and (iii) the angle-of-arrival as an average of the first-angle-of-arrival-measurement and the further-angle-of-arrival-measurements.

The receiver-system of the present disclosure can use the consistency of the delay or time mismatch between receive-paths during two or more consecutive measurements, so that processing of two or more measurements (two measurements for a two-receive-antenna system) can correct or reduce the mismatch in a robust way. The delay or time errors between multiple receive-paths of a ranging device using impulse radio, can be reduced by processing input-signals received for different configurations of the path-switching-unit and the redirect-switching-units.

The receiver-system of the present disclosure can advantageously correct group delay errors caused by amplifiers and filters and other signal processing blocks in the receive-paths of receiver-systems. This can be useful for a range of applications including impulse radio, mobile and automotive transceivers and receivers.

To summarise, the receiver-system can perform multiple measurements on the input-signals, such as angle-of-arrival measurements. The connections between the receive-antenna "matrix" and the receive-path "matrix", as well as the connections between the signal-processing-block and the processor, are interchanged in between the multiple measurements. The inter-changing of connections is achieved by the path-switching-unit and the redirect-switching-unit in response to the switch-control-signal. The multiple measurements are processed to correct for any phase-mismatch between the receive-paths, such as by averaging the multiple measurements.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. A receiver-system comprising:
   a path-switching-unit with a plurality of path-switch-input-terminals and a plurality of path-switch-output-terminals, wherein each of the plurality of path-switch-input-terminals is couplable to a receive-antenna and is configured to receive input-signals;
   a redirect-switching-unit with a plurality of redirect-switch-input-terminals and a plurality of redirect-switch-output-terminals, wherein each of the plurality of redirect-switch-output-terminals is associated with one of the plurality of path-switch-input-terminals in order to define a plurality of switch-terminal-pairs;
   a plurality of receive-paths that are connected between a path-switch-output-terminal and a redirect-switch-input-terminal, wherein each receive-path comprises one or more processing blocks;
   wherein the path-switching-unit and the redirect-switching-unit are configured to selectively connect each receive-path between different ones of the plurality of switch-terminal-pairs, based on a switch-control-signal;
   wherein the receiver-system further comprises a processor, connected to the redirect-switch-output-terminals, and configured to:
      receive first-processor-input-signals from a first configuration of the plurality of receive paths selectively connected between the plurality of switch-terminal-pairs;
      receive further-processor-input-signals from one or more further configurations of the plurality of receive-paths selectively connected between the plurality of switch-terminal-pairs; and
      determine an angle-of-arrival associated with the input-signals based on the first-processor-input-signals and further-processor-input-signals.

2. The receiver system of claim 1, wherein the processor is configured to determine the angle-of-arrival by performing an averaging operation, either directly or indirectly, on the first-processor-input-signals and further-processor-input-signals.

3. The receiver-system of claim 1, wherein the processor is configured to determine:
   a first-angle-of-arrival-measurement based on the first-processor-input-signals;
   one or more further-angle-of-arrival-measurements based on the further-processor-input-signals; and
   the angle-of-arrival associated with the input-signals based on an average of the first-angle-of-arrival-measurement and the one or more further-angle-of-arrival-measurements.

4. The receiver-system of claim 1, wherein the processor is configured to determine:
   for each switch-terminal-pair: an average-processor-input-signal by combining: (i) the first-processor-input-signal for the switch-terminal-pair; with (ii) the further-processor-input-signal for the same switch-terminal-pair received via a different receive-path; and
   the angle-of-arrival based on the average-processor-input-signals for each of the switch-terminal-pairs.

5. The receiver-system of claim 1, wherein the processor is configured to determine the angle-of-arrival using relative-phase-differences or relative-time-differences between input-signals received via different switch-terminal-pairs.

6. The receiver-system of claim 1, further comprising a controller configured to provide the switch-control-signal to the path-switching-unit and the redirect-switching-unit, wherein the controller is configured to provide the switch-control-signal in response to input-signals received by one or more of the plurality of path-switch-input-terminals.

7. The receiver-system of claim 1, wherein the processor is configured to determine:
   the angle-of-arrival associated with the input-signals based on differences between one first-processor-input-signal and one or more further-processor-input-signals received via the same receive-path, for one or more receive-paths.

8. The receiver-system of claim 1, in which the switch-control-signal is configured to control the path-switching-unit and the redirect-switching-unit such that the plurality of switch-terminal-pairs remain connected together through the receive-paths irrespective of which of the receive-paths is used to process any particular input-signal.

9. The receiver-system of claim 6, wherein the controller is configured to change the state of the switch-control-signal between frames of the input-signals.

10. The receiver-system of claim 6, wherein the controller is configured to change the state of the switch-control-signal within a single frame of the input-signals.

11. The receiver-system of claim 1, wherein each of the plurality of receive-paths comprises one or more of the following processing blocks:
   a low-noise-amplifier;
   an analog to digital converter; and
   a signal processing block.

12. The receiver-system of claim 1, wherein the receiver-system is configured to be connected to at least three receive-antennas wherein at least one of the at least three receive-antennas is not collinear with the other receive-antennas, and the processor is configured to determine an azimuthal angle-of-arrival associated with the input-signals and an elevation-angle-of-arrival associated with the input-signals.

13. A method of determining an angle-of-arrival of input-signals received at a receiver-system, wherein the receiver-system comprises:
   a plurality of receive-paths that each comprise one or more processing blocks, wherein each of the plurality of receive-paths is selectively connectable between different ones of a plurality of switch-terminal-pairs, wherein each of the plurality of switch-terminal pairs includes an input terminal and an output terminal;
the method comprising:
   receiving first-processor-input-signals from a first configuration of the plurality of receive paths between the plurality of switch-terminal-pairs;
   receiving further-processor-input-signals from one or more further configurations of the plurality of receive-paths between the plurality of switch-terminal-pairs; and
   determining an angle-of-arrival associated with the input-signals based on the received first-processor-input-signals and further-processor-input-signals;
   providing a switch-control-signal to set the configuration of the plurality of receive paths;
   providing the switch-control-signal to change the configuration of the plurality of receive paths from the first configuration to a further configuration after receiving the first-processor-input-signals.

* * * * *